(12) United States Patent
Date et al.

(10) Patent No.: US 7,380,458 B1
(45) Date of Patent: Jun. 3, 2008

(54) PRESSURE SENSOR PORT

(75) Inventors: Ram Date, Novi, MI (US); Ryan Muschong, Oak Park, MI (US); William M Leach, West Bloomfield, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 11/713,419

(22) Filed: Mar. 2, 2007

(51) Int. Cl.
*B60K 28/10* (2006.01)
(52) U.S. Cl. .................. 73/700; 180/274; 280/735
(58) Field of Classification Search .............. 73/700; 180/274; 280/735
See application file for complete search history.

(56) References Cited

U.S. PATENT DOCUMENTS 5,748,075 A 5/1998 Dirmeyer et al.

2006/0155504 A1* 7/2006 Adam et al. ............... 702/138
2006/0266101 A1* 11/2006 Takehara et al. ............ 73/12.09
2007/0000710 A1* 1/2007 Hawes et al. ............... 180/274
2007/0089520 A1* 4/2007 Wanami et al. ............. 73/700

* cited by examiner

*Primary Examiner*—Andre J Allen
(74) *Attorney, Agent, or Firm*—Sally J Brown; Brinks Hofer Gilson & Lione

(57) ABSTRACT

A pressure sensor port having reduced potential for blockage of a sensor by debris in a fluid. The pressure sensor includes a housing forming the sensor port. The sensor port defines an internal passage connecting an exterior aperture to an interior aperture. The exterior aperture communicates the fluid to the internal passage and includes a longitudinal rib. The interior aperture is aligned with a pressure transducer within the housing and the fluid in the internal passage to engage the pressure sensor. The longitudinal rib includes a first end proximal to the exterior aperture. The longitudinal rib is slightly off-center within the exterior aperture, defining at least first and second aperture sections having different cross-sectional areas.

17 Claims, 4 Drawing Sheets

PRESSURE SENSOR PORT

BACKGROUND OF THE INVENTION

1. Field of the Invention

The present invention generally relates to an air pressure sensor. More specifically, the invention relates to pressure sensor ports for use in motor vehicle safety systems that minimize the possibility of debris blocking the opening in the port and impairing the performance of the pressure sensor.

2. Description of Related Art

Pressure sensor assemblies used in motor vehicles for side impact detection have an open port to enable sensing of air pressure changes at the sensor. The port has a potential for blockage by foreign objects due to, for example, their location in a vehicle door cavity. These sensors are intended to measure the pressure of a working fluid, most typically air. However, the volume inside a vehicle door cavity can at times get dust and debris remaining from the process of manufacturing the door and through use of the vehicle. This dust and debris have the potential of blocking an exterior aperture of the pressure sensor and reducing the performance of the pressure sensor assembly.

In view of the above, there exists a need for an improved design for a pressure sensor that is less susceptible to blockage by dust and debris.

SUMMARY OF THE INVENTION

In satisfying the above need, as well as overcoming the enumerated drawbacks and other limitations of the related art, the present invention provides a pressure sensor assembly for a motor vehicle, for measuring air pressure changes to detect an impact event, having improved features for preventing port blockage.

The pressure sensor assembly of the present invention includes a housing having an opening and defining an interior volume, a pressure sensor sensitive to changes in the pressure of a fluid, and a sensor port on an exterior of the housing. The pressure sensor is disposed within the interior volume of the housing. Both the pressure sensor and the sensor port are located in proximity to the opening in the housing. The sensor port includes an exterior face having an exterior aperture and defines an internal passage communicating between the exterior aperture and an interior aperture. The exterior aperture includes a longitudinal rib. The interior aperture is aligned with the opening in the housing and permits the pressure sensor within the housing to be exposed to the fluid within the internal passage.

The longitudinal rib includes a first end located adjacent to the exterior aperture and a second end positioned along a length of the internal passage. The longitudinal rib protrudes from at least one wall of the internal passage and defines a first and a second aperture section within the exterior aperture. The rib is further positioned within the exterior aperture to prevent foreign objects from blocking the exterior aperture by, for example, extending the first end slightly beyond the exterior aperture.

According to one embodiment of the invention, the longitudinal rib is positioned off-center relative to the exterior aperture such that the first and second aperture sections have different cross-sectional areas and shapes.

In another embodiment of the present invention, the longitudinal rib has a rib height being less than an internal passage height, thereby defining a third aperture section above the longitudinal rib within the exterior aperture. In this embodiment, the third aperture has a cross-sectional area and shape different from the cross-sectional areas and shapes of the first and second aperture sections.

The height and length of the longitudinal rib are preferably substantially greater than a width of the longitudinal rib. In some embodiments, the longitudinal rib extends along the length of the internal passage such that the second end is located adjacent to the interior aperture.

According to a third embodiment of the present invention, the exterior face of the port, and the exterior aperture, is oriented at an acute angle relative to a central passage axis defined along the length of the internal passage.

According to yet another embodiment of the present invention, the pressure sensor assembly also includes a transverse rib extending across a width of the internal passage. In other embodiments, the transverse rib may be arranged perpendicular to the longitudinal rib. Furthermore, the transverse rib may also be located adjacent to the interior aperture and the height of the transverse rib may be substantially less than the height of the internal passage.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
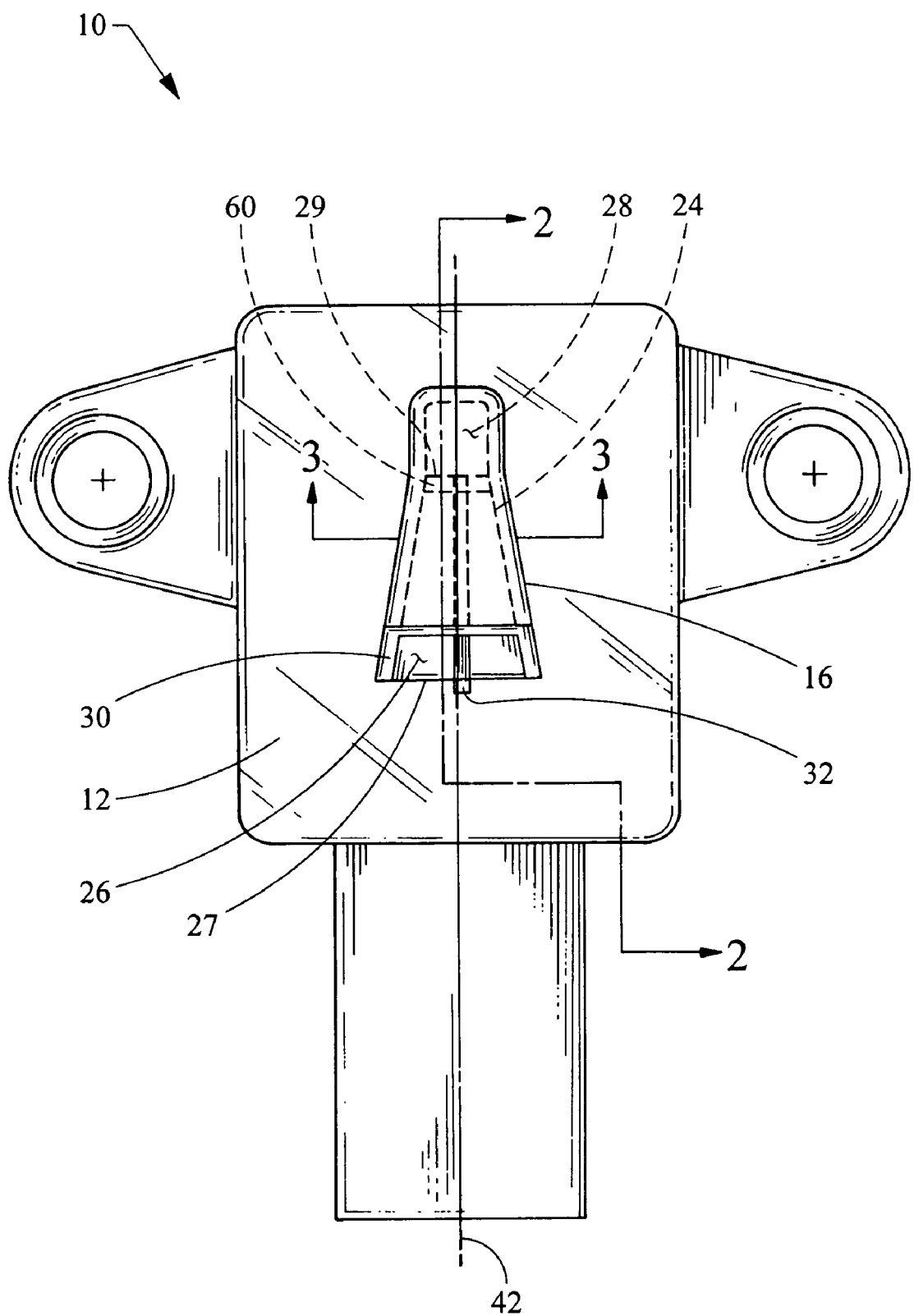
FIG. 1 is a plan view of a pressure sensor assembly according to the present invention.
Figure 2:
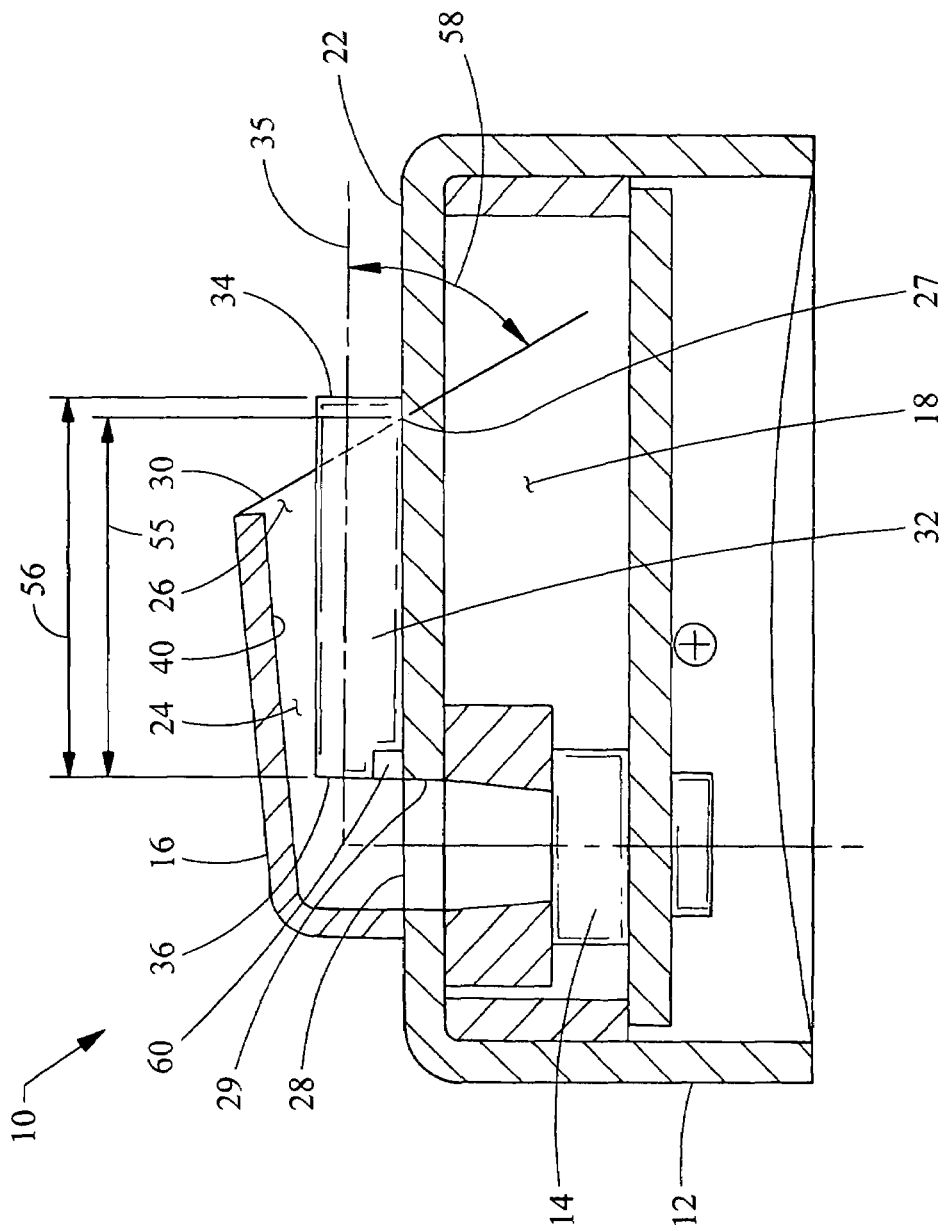
FIG. 2 is a sectional view along line 2-2 of the pressure sensor assembly of FIG. 1.

Referring now to FIG. 1, a pressure sensor assembly embodying the principles of the present invention is illustrated therein and designated at 10. As its primary components, the sensor assembly 10 includes a pressure sensor housing 12 having a sensor port 16 and, an interior aperture 28. As best shown in FIG. 2, the pressure sensor housing 12 defines the sensor port 16 and an interior volume 18 within which a pressure transducer 14 is disposed. The pressure transducer 14 is sensitive to changes in the pressure of a fluid in the port. Pressure transducer 14 produces an electrical signal in response to fluid pressure changes. The sensor port 16 is formed on a top exterior surface 22 of the pressure sensor housing 12 over the interior aperture 28.

The sensor port 16 defines an internal passage 24 between the interior aperture 28 and an exterior aperture 26. The exterior aperture 26 is defined within an exterior face 30 of the sensor port 16 and is in communication with an exterior fluid environment. The fluid environment is air for the primary application of the pressure sensor assembly, but could include other fluids. The interior aperture 28 is positioned in proximity to the pressure transducer 14, thereby permitting the fluid communicating through the exterior aperture 26 into the internal passage 24 to engage the pressure transducer 14. This communication path allows the pressure transducer 14 to measure the pressure of the exterior fluid environment.

A longitudinal rib 32 extends into the exterior aperture 26 along at least part of a length 55 of the internal passage 24. In the embodiment shown in FIG. 2, the length 55 of the internal passage 24 is defined between a proximal edge 29 of the interior aperture 28 and a lower edge 27 of the exterior aperture 26. A first end 34 of the longitudinal rib 32 is located adjacent to the exterior aperture 26 and a second end 36 is located within the internal passage 24 adjacent to the interior aperture 28. A rib length 56 is defined between the two ends 34 and 36. In the example shown, the rib length 56 is greater than the length 55 of the internal passage 24 such that the first end 34 protrudes slightly beyond the exterior aperture 26. However, in other embodiments, the rib length 56 may be less than the length 55 of the internal passage 24 as long as the first end 34 protrudes beyond the exterior aperture 26 and into the exterior fluid environment.

Figure 3:
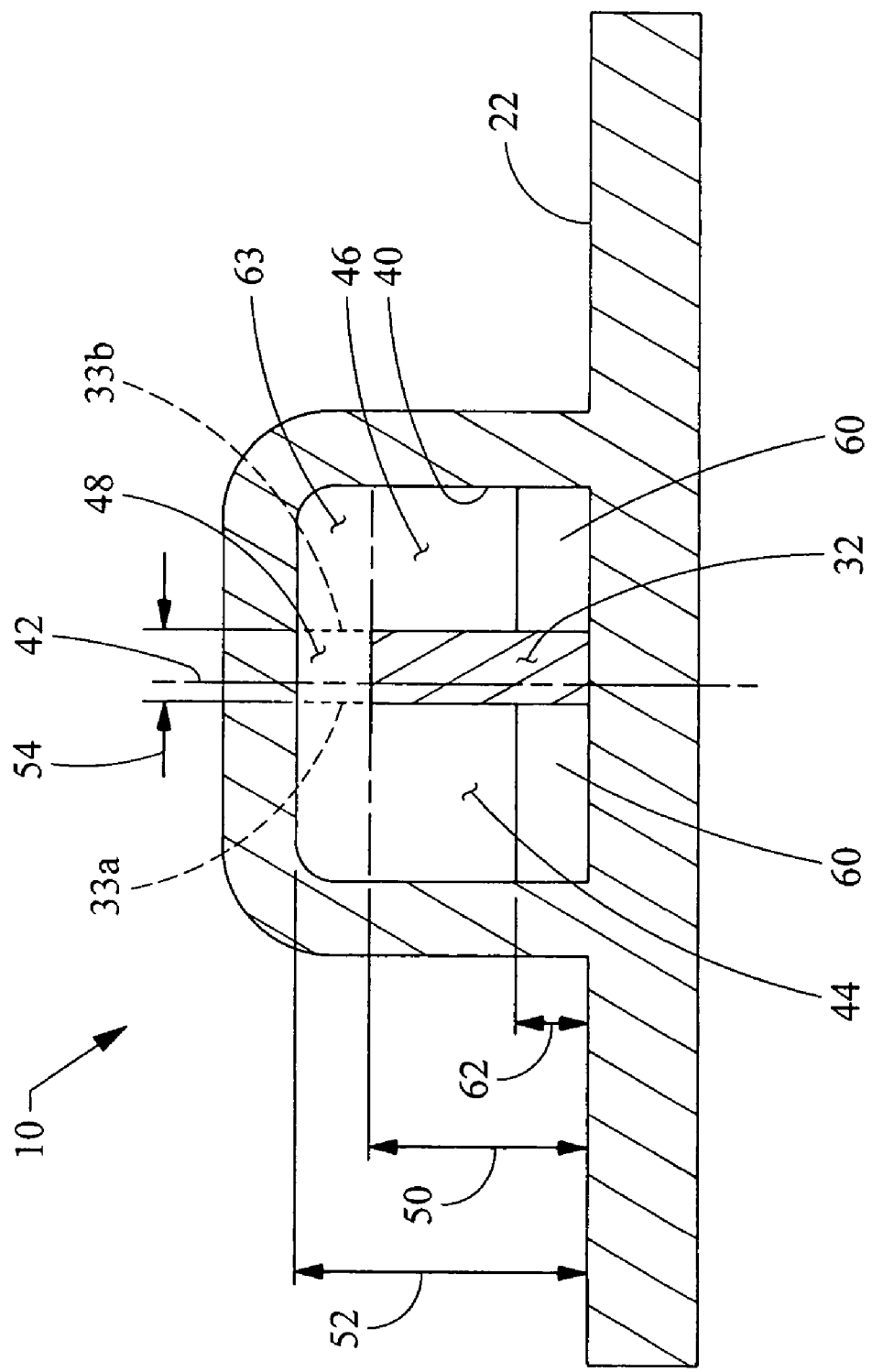
FIG. 3 is a partial sectional view along line 3-3 of the pressure sensor assembly of FIG. 1.

As best shown in FIG. 3, the longitudinal rib 32 protrudes from at least one wall 40 of the internal passage 24. The longitudinal rib 32 is positioned slightly offset from a centerline 42 of the exterior aperture 26 defining a first aperture section 44 and a second aperture section 46 each having different cross-sectional areas when viewed in the direction of the line 3-3 shown in FIG. 1. The first aperture section 44 is bounded by the longitudinal rib 32 and a rib projection line 33a on one side and by the passage wall 40 on the remaining sides. Likewise, the second aperture section 46 is bounded by the longitudinal rib 32 and a rib projection line 33b on one side and also by the passage wall 40 on the other sides.

In some embodiments, as shown in FIG. 3, the longitudinal rib 32 may also form a rib height 50 less than an internal passage height 52, thereby defining a third aperture section 48 above the longitudinal rib 32. The third aperture section 48 may be bounded on one side by the longitudinal rib 32, on two other sides by the projection lines 33a and 33b, and by the passage wall 40 on the remaining side. The third aperture section 48 has a cross-sectional area different from the other two aperture sections 44 and 46.

As a result of the above arrangement, the present invention is able to minimize the possibility of debris within the fluid completely blocking the exterior aperture 26. First of all, since the first end 34 of the longitudinal rib 32 protrudes slightly beyond the exterior aperture 26, full blockage of the exterior aperture 26 by a planar object is prevented. Second, offsetting the longitudinal rib 32 from the centerline 42 and having the rib height 50 be less than the passage height 52 means three pieces of differently sized debris are required to completely block the three aperture sections 44, 46 and 48. Thus, any one object of the size equal to 44 or 46 or 48 shall not block more than 60% of the total area of 44, 46 and 48. In addition, the rib height 50 may be designed such that an object of the size equal to section 63 defined by the rib height shall not block more than 60% of the total area of 44, 46 and 48. As a result, the present invention is less susceptible to blockage from debris in the fluid.

It should be appreciated that the above relative dimensions are but one example of the present invention. Other proportions are possible that conform to the scope and spirit of the present invention as described above.

Figure 4:
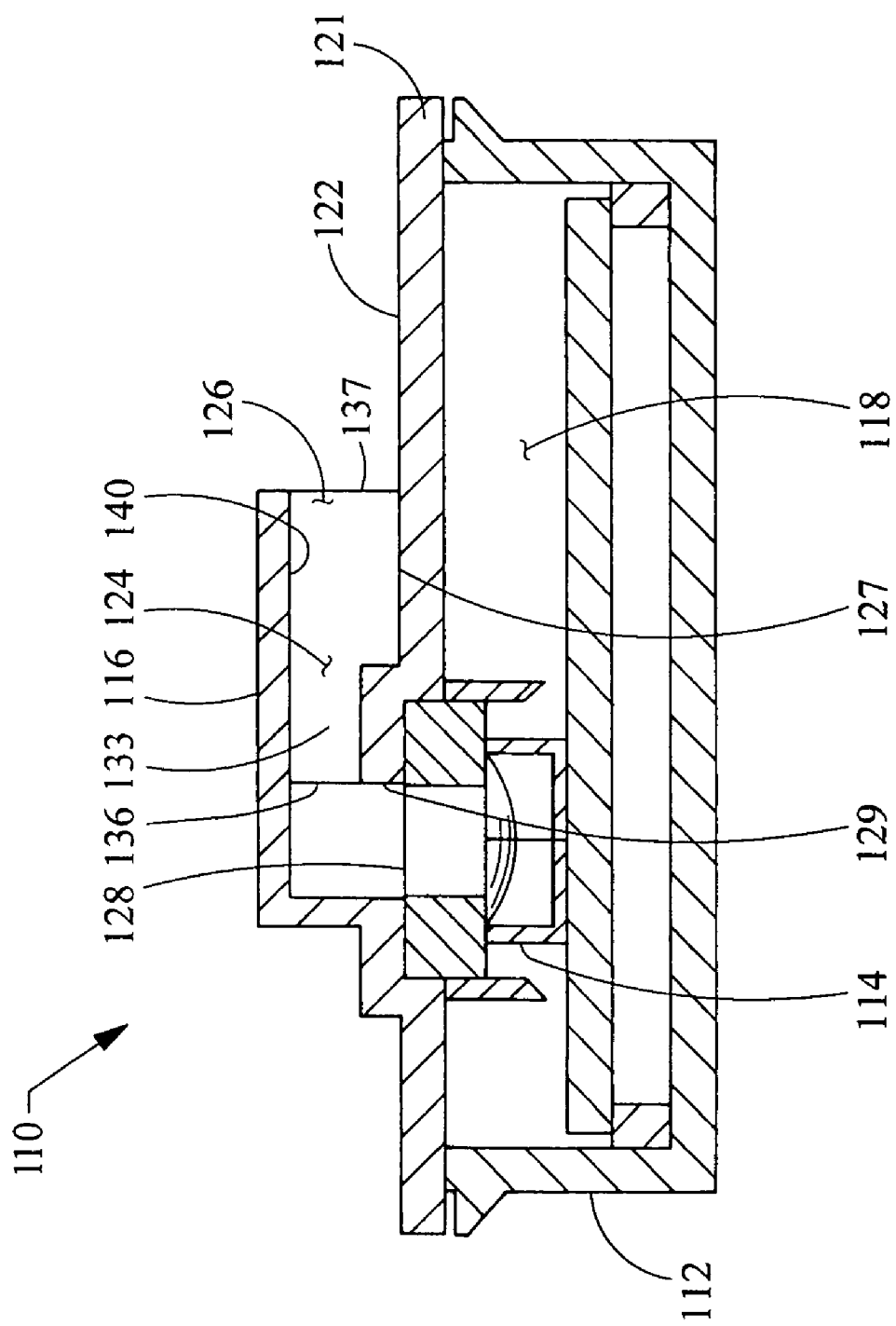
FIG. 4 is a section view of an alternate embodiment of the pressure sensor assembly of FIG. 2.

FIG. 4 shows an alternate embodiment of the present invention similar to FIG. 2. In this embodiment, like features have like numbers indexed by 100. For example, the top exterior surface 22 of FIG. 2 corresponds to a top exterior surface 122 of FIG. 4. Likewise, the sensor port 16 corresponds to a sensor port 116 and the interior aperture 28 corresponds to an interior aperture 128. While this embodiment is similar to that of FIG. 2, one difference is that the sensor port 116 is part of a cover 121 and the sensor housing 112 houses a pressure transducer 114.

Additional alternate embodiments may include other optional features to increase the tolerance of the present invention to debris in the fluid. As best shown in FIG. 2, the exterior face 30, and hence the exterior aperture 26, are inclined at an acute angle 58 with respect to a central passage axis 35 arranged approximately along the length 55 of the internal passage 24. In the embodiment shown, the acute angle 58 is approximately sixty degrees, but may be more or less depending on the needs of a particular application. As a result, the combination of the acute angle 58 with the protruding longitudinal rib 32 will maximize the area of the exterior aperture 26, thereby further reducing the possibility that any single planar object will cause a pressure drop that significantly impairs the performance of the pressure sensor assembly 10.

To minimize dust migration into the pressure sensor 14, the internal passage 24 may also include a transverse rib 60. In the embodiment shown in FIG. 1, the transverse rib 60 may extend across the width of the internal passage 24 and be arranged approximately perpendicular to the longitudinal rib 32. In other embodiments the transverse rib 60 may be arranged at other angles that still permit the transverse rib 60 to extend across the width of the internal passage 24. As best shown in FIG. 2, the transverse rib 60 is shown located at the second end 36 of the longitudinal rib 32 on the wall 40 of the internal passage adjacent the interior aperture 28. While locating the transverse rib 60 adjacent the interior aperture 28 is preferred, other embodiments may position the transverse rib 60 anywhere along the length of the internal passage 24 between the exterior aperture 26 and the interior aperture 28. Turning to FIG. 3, the transverse rib 60 forms a transverse rib height 62. The transverse rib height 62 is typically much less than the internal passage height 52. In the example of FIG. 3, the transverse rib height 62 is about four times less than the internal passage height 52. However, this is but one example and other relative dimensions are possible depending on the needs of a particular application.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A pressure sensor port for a motor vehicle for measuring pressure changes of a fluid to detect an impact event, the pressure sensor port comprising:

a pressure transducer;

a housing assembly forming an internal volume and a sensor port, the pressure transducer disposed within the internal volume, the sensor port forms an internal passage having a length extending between an exterior aperture and an interior aperture of the sensor port;

the exterior aperture is disposed in an exterior face of the sensor port, and the interior aperture is in proximity to the pressure transducer and permits the fluid to engage the pressure transducer; wherein the exterior aperture includes a longitudinal rib, the longitudinal rib has a first end located adjacent to the exterior aperture and a second end positioned within the internal passage, the longitudinal rib cooperates with the walls of the internal passage to divide up a cross section area of the inlet port into three areas such that any single object cannot block the entire sensor port.

2. The pressure sensor port of claim 1, wherein the first end of the longitudinal rib extends beyond the exterior aperture into the fluid.

3. The pressure sensor port of claim 1, wherein the first end of the longitudinal rib is flush with the exterior aperture.

4. The pressure sensor port of claim 1, wherein the longitudinal rib protrudes from at least one surface of the wall of the internal passage and is positioned off-center relative to the exterior aperture.

5. The pressure sensor port of claim 1, wherein the longitudinal rib forms a rib height, the rib height being less than an internal passage height thereby defining the three aperture areas within the exterior aperture to the left, above and to the right of the longitudinal rib.

6. The pressure sensor port of claim 5, wherein the three aperture areas have different cross-sectional areas.

7. The pressure sensor port of claim 1, wherein the second end is located adjacent to the interior aperture.

8. The pressure sensor port of claim 1, further comprising a central passage axis defined along the length of the internal passage, wherein the exterior face and exterior aperture are oriented at an acute angle relative to the central passage axis.

9. The pressure sensor port of claim 1, further including a transverse rib extending across a width of the internal passage.

10. The pressure sensor port of claim 9, wherein the transverse rib is arranged perpendicular to the longitudinal rib.

11. The pressure sensor port of claim 9, wherein the transverse rib is located adjacent to the interior aperture.

12. The pressure sensor port of claim 9, wherein a height of the transverse rib is substantially less than a height of the internal passage.

13. A pressure sensor port for a motor vehicle for measuring pressure changes of a fluid to detect an impact event, the pressure sensor port comprising:
a pressure transducer;
a housing assembly forming an internal volume and a sensor port, the pressure transducer disposed within the internal volume, the sensor port forms an internal passage having a length extending between an exterior aperture and an interior aperture of the sensor port;
the exterior aperture is disposed in an exterior face of the sensor port and the interior aperture is in proximity to the pressure transducer and permits the fluid to engage the pressure transducer; wherein
the exterior aperture includes a longitudinal rib, the longitudinal rib has a first end extending beyond the exterior aperture into the fluid and a second end positioned within the internal passage, the longitudinal rib protrudes from at least one wall of the internal passage and cooperates with the walls to define a first and a second aperture section within the exterior aperture, the longitudinal rib forms a rib height less than a wall height of the internal passage to define a three rectangular areas around the longitudinal rib, wherein the longitudinal rib is positioned off-center relative to the exterior aperture such that each of the three aperture sections have different cross-sectional areas and thereby reduce blockage of the inlet port by debris in the fluid.

14. The pressure sensor port of claim 13, further comprising a central passage axis defined along the length of the internal passage, wherein the exterior face and exterior aperture are oriented at an acute angle relative to the central passage axis.

15. The pressure sensor port of claim 13, further including a transverse rib extending across a width of the internal passage and arranged perpendicular to the longitudinal rib.

16. The pressure sensor port of claim 15, wherein the transverse rib is located adjacent to the interior aperture.

17. The pressure sensor port of claim 15, wherein the transverse rib forms a height much less than a height of the internal passage.

* * * * *